United States Patent
Laur et al.

(10) Patent No.: US 9,727,056 B2
(45) Date of Patent: Aug. 8, 2017

(54) AUTOMATED VEHICLE CONTROL WITH TIME TO TAKE-OVER COMPENSATION

(71) Applicant: DELPHI TECHNOLOGIES, INC., Troy, MI (US)

(72) Inventors: Michael H. Laur, Mission Viejo, CA (US); Ludong Sun, Sanford, CA (US); Indu Vijayan, Sunnyvale, CA (US); Serge Lambermont, Maastricht (NL); Ryan S. Middleton, Mountain View, CA (US)

(73) Assignee: Delphi Technologies, Inc., Troy, MI (US)

( * ) Notice: Subject to any disclaimer, the term of this patent is extended or adjusted under 35 U.S.C. 154(b) by 77 days.

(21) Appl. No.: 14/748,530

(22) Filed: Jun. 24, 2015

(65) Prior Publication Data

US 2016/0378114 A1    Dec. 29, 2016

(51) Int. Cl.
G05D 1/00    (2006.01)
G05B 13/02    (2006.01)

(52) U.S. Cl.
CPC ......... G05D 1/0061 (2013.01); G05B 13/026 (2013.01); G05D 1/0088 (2013.01)

(58) Field of Classification Search
CPC ...... B60K 28/10; B60K 28/02; G05D 1/0061; G05D 1/0088; G05B 13/026
See application file for complete search history.

(56) References Cited

U.S. PATENT DOCUMENTS

| | | | |
|---|---|---|---|
| 2003/0085810 A1* | 5/2003 | Bullinger | B60T 7/042 340/576 |
| 2010/0256836 A1 | 10/2010 | Mudalige | |
| 2012/0212353 A1 | 8/2012 | Fung et al. | |
| 2014/0303827 A1 | 10/2014 | Dolgov et al. | |
| 2014/0336935 A1* | 11/2014 | Zhu | G01W 1/14 702/3 |
| 2015/0070160 A1 | 3/2015 | Davidsson et al. | |
| 2015/0092056 A1* | 4/2015 | Rau | G08G 1/167 348/148 |
| 2016/0070966 A1* | 3/2016 | Yang | B60W 40/08 345/8 |
| 2016/0185350 A1* | 6/2016 | Kelly | B60W 30/18 701/94 |

FOREIGN PATENT DOCUMENTS

JP    07-195956 A    8/1995

* cited by examiner

Primary Examiner — Basil T Jos
(74) Attorney, Agent, or Firm — Lawrence D. Hazelton

(57) ABSTRACT

A system for changing a control-mode of an automated vehicle from automated-control to manual-control includes an operator-detection device and a controller. The operator-detection device is operable to detect a readiness-state of an operator of a vehicle while a control-mode of the vehicle is automated-control. The controller is configured to forecast a future-time when the control-mode of the vehicle should change from automated-control to manual-control and determine a take-over-interval for an operator to assume manual-control of the vehicle once notified. The take-over-interval is determined based on the readiness-state. The controller is also configured to notify the operator that the control-mode of the vehicle should change from automated-control to manual-control no later than the take-over-interval prior to the future-time.

8 Claims, 2 Drawing Sheets

AUTOMATED VEHICLE CONTROL WITH TIME TO TAKE-OVER COMPENSATION

TECHNICAL FIELD OF INVENTION

This disclosure generally relates to a system for control of an automated vehicle, and more particularly relates to determining a take-over-interval for an operator to assume manual-control of the vehicle based on a readiness-state of the operator.

BACKGROUND OF INVENTION

Passenger vehicles (e.g. automobiles) with various degrees of automation have been proposed. Vehicles equipped with automated speed control, commonly known as cruise control, are well-known. Fully automated or autonomous vehicles where the operator is not engaged with any aspect of operating the vehicle are being developed. However, it is contemplated that unexpected traffic scenarios or situations will arise when it will be preferable to have the operator assume manual control of the vehicle.

SUMMARY OF THE INVENTION

In accordance with one embodiment, a system for changing a control-mode of an automated vehicle from automated-control to manual-control is provided. The system includes an operator-detection device and a controller. The operator-detection device is operable to detect a readiness-state of an operator of a vehicle while a control-mode of the vehicle is automated-control. The controller is configured to forecast a future-time when the control-mode of the vehicle should change from automated-control to manual-control and determine a take-over-interval for an operator to assume manual-control of the vehicle once notified. The take-over-interval is determined based on the readiness-state. The controller is also configured to notify the operator that the control-mode of the vehicle should change from automated-control to manual-control no later than the take-over-interval prior to the future-time.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
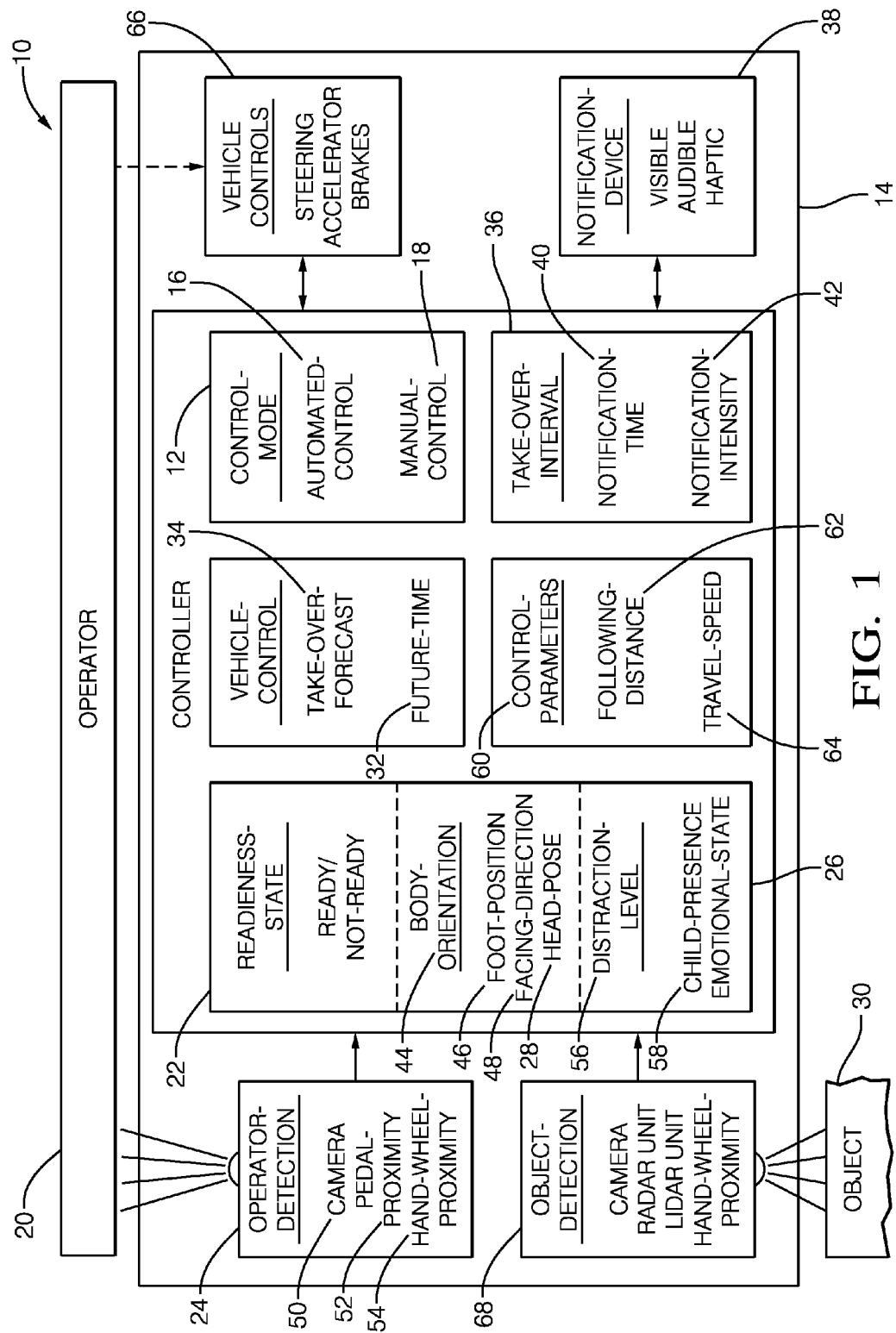
FIG. 1 is a diagram of a system for control of an automated vehicle in accordance with one embodiment.

FIG. 1 illustrates a non-limiting example of a system 10 for changing a control-mode 12 of an automated vehicle 14 (hereafter referred to as the vehicle 14) from automated-control 16 to manual-control 18. Automated vehicles are being developed with the goal being that an operator 20 of the vehicle 14 is little more than a passenger. A fully-automated or autonomous vehicle is envisioned where the operator 20 does not participate in any aspect of operational-control of the vehicle 14, other than to indicate a destination. However, it is contemplated that, at least in the early development stages, unexpected circumstances may arise whereupon the operator 20 should assume manual-control 18 of the vehicle 14. For example, it may be safer for the operator 20 and others around the vehicle 14 if the operator 20 assumes manual-control while traveling in a construction-area where no roadway or other indications of a travel path are available for the automated-vehicle to use to navigate through the construction-area.

It is also envisioned that as people become accustomed to traveling in an automated or autonomous vehicle, the operator 20 is likely to pay less attention to the roadway and objects (e.g. other-vehicles, pedestrians) proximate to the vehicle 14, and will likely engage in activities such as reading, sleeping, or participating in a meeting. It is recognized that it may be necessary to provide substantial advanced warning to the operator 20 if conditions arise that make changing the control-mode 12 from automated-control 16 to manual-control 18, and the operator 20 is, for example, asleep. As such, the amount of time necessary for the operator 20 to prepare for taking manual-control of the vehicle 14 will vary based on a readiness-state 22 of the operator 20. As will be describe in more detail below, the system 10 described herein is an improvement over prior systems because the advanced-warning time necessary for the operator 20 to prepare for taking manual-control of the vehicle 14 will be determined based on the readiness-state 22 of the operator 20.

The system 10 includes an operator-detection device 24 operable to detect the readiness-state 22 of the operator 20 of a vehicle 14 while the control-mode 12 of the vehicle is automated-control 16. The operator-detection device 24 may include a camera 50 configured to capture images of the operator 20 in the visible light spectrum and/or the infrared light spectrum, and a light source that emits light in a suitable portion of the light spectrum so the camera 50 can see the operator 20 regardless of ambient lighting conditions. The images of the operator 20 may be processed/analyzed by the operator-detection device 24 or a controller 26 to, for example, determine if the eyes of the operator 20 are closed indicating that the operator 20 is sleeping, determine if the head-pose 28 of the operator 20 varies in a manner that indicates that the operator 20 is tired, and/or determine if the eye-gaze direction of the operator 20 indicates that the operator 20 has or has not seen an object 30 proximate to the vehicle 14. Image processing techniques to determine the readiness-state 22 (e.g. ready or not ready) of the operator 20 based on various indicators such as where the operator is looking (eye-gaze direction) and/or if the operator 20 is alert (eye-blinking, head-pose variation) are well-known.

The operator-detection device 24 may include a pedal-proximity sensor 52 configured to determine when the feet of the operator 20 are close to or in contact with the brake-pedal (not shown) and/or the accelerator-pedal (not shown). If the operator's feet are close to or contacting either pedal, then that may be used as an indication that the readiness-state 22 is closer to READY rather than NOT-READY. Alternatively, the position of the operator's feet may be determined optically with a camera, or with an ultrasonic transducer. Similarly, the operator-detection device 24 may include a hand-wheel-proximity sensor 54 configured to determine when one or both hands are close to or in contact with the hand-wheel (i.e. steering-wheel).

The controller 26 may include a processor (not specifically shown) such as a microprocessor or other control circuitry such as analog and/or digital control circuitry including an application specific integrated circuit (ASIC) for processing data as should be evident to those in the art. The controller 26 may include memory (not specifically shown) including non-volatile memory, such as electrically erasable programmable read-only memory (EEPROM) for storing one or more routines, thresholds and captured data. The one or more routines may be executed by the processor to perform steps for processing signals received by the controller 26 for operating the vehicle 14 as described herein.

The controller 26 is also configured to formulate a take-over-forecast 34 to forecast a future-time 32 when the control-mode 12 of the vehicle 14 should change from automated-control 16 to manual-control 18. As used herein, the term 'future-time' is used to indicate how far into the future from the present-time the vehicle 14 should make the change from automated-control 16 to manual-control 18 mode of operation. It is contemplated that situations will arise whereby an anticipated changing of the control-mode 12 (i.e. the take-over-forecast 36) will not be necessary for a relatively long time, several minutes for example. By way of example and not limitation, the prediction or forecasting of future-time 32 for the mode-change may be well-anticipated when the destination is past the boundaries of well-defined map-data, or based upon prior encounters of a construction area.

The controller 26 is also configured to determine a take-over-interval 36 that is generally characterized as an expected amount of time necessary for the operator 20 to prepare to assume manual-control 18 of the vehicle 14 once notified, i.e. after the operator 20 is notified. The take-over-interval 36 may be determined based on, among other things, the readiness-state 22 of the operator 20. While FIG. 1 suggests only two states, READY and NOT-READY, many degrees of readiness are contemplated and the take-over-interval 36 indicates a measure of time with a continuously variable value. In particular, it is contemplated that the NOT-READY state will includes many different states such as, but not limited to: slightly-distracted, moderately-distracted, very-distracted, out-of-position, sleeping, medical-distress, unconscious, and intoxicated. Furthermore, it is contemplated that the readiness-state 22 in some instances will be such that the operator 20 is unable to or should not assume manual-control 18 of the vehicle 14, so the controller 26 may be configured to, for example, stop the vehicle 14, continue under automated-control 16 but at greatly reduced speeds, or change the destination to the nearest hospital.

Assuming that the readiness-state 22 of the operator 20 is such that the operator 20 is able to assume manual-control 18 of the vehicle 14 given sufficient advanced warning, the controller 26 is further configured to notify the operator 20 that the control-mode 12 of the vehicle should change from automated-control 16 to manual-control 18 no later than the take-over-interval 36 prior to the future-time 32. That is, given that the controller as formulated the take-over-forecast 34 and determined the future-time 32 that the operator 20 should have manual-control of the vehicle 14, the controller 26 may activate a notification-device 38 at a notification-time 40 at or prior to the take-over-interval 36 before the future-time 32. In other words, the controller 26 determines the notification-time 40 that the notification device 38 is activated so the operator 20 has sufficient time to prepare for manual-control 18, and the notification-time 40 corresponds or is prior to the take-over-interval 36 before the future-time 32.

The notification-device 38 that may include, for example, a visible warning device such as an illuminated indicator or a highlighted region of a reconfigurable display, an audible warning device such as a buzzer or speaker, and/or a haptic warning device such as a vibrating device located in a seat or steering wheel of the vehicle 14. The controller 26 may also determine a notification-intensity 42 that is variable. The intensity of a notification provided by the notification-device 38 may be increased by, for example, increasing the loudness of an audible warning, increasing the highlighting intensity or vigorous flashing of the visible warning, and/or simultaneously combining two or more of the warning types available from the notification-device 38. It is contemplated that the notification-intensity 42 may be increased if the take-over-forecast 34 did not recognize soon-enough that the control-mode 12 should be switched from automated-control 16 to manual-control 18 to allow the operator 20 to prepare based on the readiness-state 22. For example, if the operator 20 is sleeping, and the normal take-over-interval for this readiness state is fifteen seconds, but the future-time is only twelve seconds from now, the controller may increase the loudness of the audible warning to more quickly wake-up the operator 20.

The system 10 may include an object-detection device 68 operable or useful to detect when the object 30 is proximate to the vehicle 14. The object-detection device 68 may include, but is not limited to a video camera, a radar unit, and/or a LIDAR unit suitably configured to detect various objects about the vehicle 14. By way of further example and not limitation, a camera may be used to capture images of objects such as other-vehicles, buildings, roadway signs, pedestrians, lane-markings, roadway hazards, construction area markers, and other objects located proximate to or about the vehicle 14.

Information from the camera may be combined with detection information from the radar unit and/or the LIDAR unit to form a two-dimensional or three-dimensional map of various objects in the area surrounding the vehicle 14. Information gathered by the operation of the object-detection device 68 may be provided to the controller 26 for further analysis. That is, the object-detection device 68 may not by itself actually determine the location of or classification of the object 30. Typically that task falls to the controller 26, but this is not a requirement of the system 10. In other words, either the object-detection device 68 or the controller 26 may perform the data or signal processing necessary to determine a relative location or classification of the object 30.

The system 10 may be configured to classify the object 30 based on signals received from the object-detection device 68. For example, if the object 30 is a pedestrian walking perpendicular to the direction of travel of the vehicle 14, signals from the LIDAR unit or the radar unit may have a unique signature caused by the alternating motion of the legs of the pedestrian. Similarly, radar returns reflected from a moving vehicle may include micro-fluctuations cause by the rotational motion of the wheels of the moving vehicle. This information may optionally be combined with other known image processing techniques to classify the object as, for example, a pedestrian, another-vehicle, a construction-zone marker, an animal, a roadway barrier, etc. Information about motion of the object 30 may also be used to classify the object 30 and assign motion related parameters such as speed, trajectory, acceleration/deceleration, and the like to the object 30. As such, the object-detection device 68 is operable to detect when the object 30 is proximate to, i.e. close-by, in the travel-path, or approaching the travel path of the vehicle 14.

Continuing to refer to FIG. 1, the readiness-state 22 may be determined based on body-orientation 44 of the operator 20. In general, if the body-orientation 44 is other than something very close to what would be the case when the operator 20 was manually operating the vehicle 14, the readiness state 22 is likely to be set to something other than READY. By way of example and not limitation, the operator 20 may have the readiness-state 22 set to READY if the operator 20 is sitting squarely in the driver's seat, facing forward, attentive to the roadway and surroundings about the vehicle 14, with feet close to but not necessarily touching the brake-pedal and the accelerator-pedal, and hands empty and positioned so the hand-wheel (i.e. steering-wheel) can be quickly grasped if the operator 20 is notified to do so. If the body-orientation 44 is much different that described above, the readiness-state will be set to something other than READY, that is to one of a variety of readiness-states that are related to or lumped under NOT-READY.

By way of example and not limitation, the body-orientation 44 may be determined based on a foot-position 46 of a foot of the operator. If the foot-position 46 corresponds to the operator's feet being close to or contacting either pedal, then that may be used as an indication that the readiness-state 22 is closer to READY than NOT-READY. However, if the operator's feet are crossed, or one foot is tucked under the other leg, or one foot is stretched out into the passenger-side foot-well, then that may be used as an indication that the readiness-state 22 is NOT-READY rather than READY. By way of further example, the take-over-interval 36 when only the feet are out of position may be on the order of four seconds. Other examples of the body-orientation 44 that cause longer and shorter value of the take-over-interval 36 are given below.

By way of another example and not limitation, the body-orientation 44 may be determined based on a facing-direction 48 of the operator. As used herein, the facing-direction 48 is generally determined based on the orientation of the torso/shoulders. If the torso/shoulders are square to, i.e. facing, the hand-wheel, then that may be used as an indication that the readiness-state 22 is closer to READY than NOT-READY. However, if the facing-direction 48 is turned away from the hand-wheel because, for example the operator 20 is sitting sideways in the seat or lying down, then that may be used as an indication that the readiness-state 22 is NOT-READY rather than READY. If the facing-direction 48 is sideways because the operator 20 is sitting sideways in the seat, then the take-over-interval 36 may be on the order of seven seconds.

By way of another example and not limitation, the body-orientation 44 may be determined based on a head-pose 28 of the operator. As used herein, the head-pose 28 is determine based on the orientation of the head or face, and is generally independent of the facing-direction 48. If the head is upright and the face is facing forward, then that may be used as an indication that the readiness-state 22 is closer to READY than NOT-READY. However, if the facing-direction 48 is turned away from the roadway because, for example the operator is looking at a passenger, then that may be used as an indication that the readiness-state 22 is NOT-READY rather than READY. If the head-pose 28 is sideways because the operator 20 is looking at a passenger, but the body-orientation otherwise corresponds to READY, then the take-over-interval 36 may be on the order of only two seconds.

The system 10 may also determine the readiness-state 22 based on a distraction-level 56 of the operator 20. For example, if a child-presence 58 is detected, in combination with a head-pose 28 or a facing-direction 48, then that can be taken as an indication that the operator 20 highly-distracted or very-distracted so the take-over-interval 36 would be increased relative to a situation when the child-presence 58 was not detected and/or the head-pose 28 and the facing-direction 48 corresponded to READY. That is, the distraction-level 56 is increased when the operator 20 attends to a child present in the vehicle 14.

The controller 26 may also be configured to operate the vehicle 14 in accordance with control-parameters 60 when the control-mode 12 of the vehicle is automated-control 16 and the readiness-state 22 of the operator 20 is READY. The control-parameters 60 may be predetermined and stored in the controller, or may be down-loaded from map data stored on an internet server. The control-parameters 60 may be modified when the readiness-state of the operator is NOT-READY to allow for an increase of the take-over-interval 36. For example, the increase of the take-over-interval 36 is realized by one or more of increased following-distance 62 and decreased travel-speed 64. That is, the control parameters 60 use to operate the vehicle 14 during automated-control 16 may be changed so the controller 26 has more time to formulate the take-over-forecast 34 and a greater safety margin so the future-time 32 is more distant in the future. Then if the readiness-state 22 of the operator is other than READY, it is more likely that the take-over-interval will be too long when compared to the future-time 32.

Figure 2:
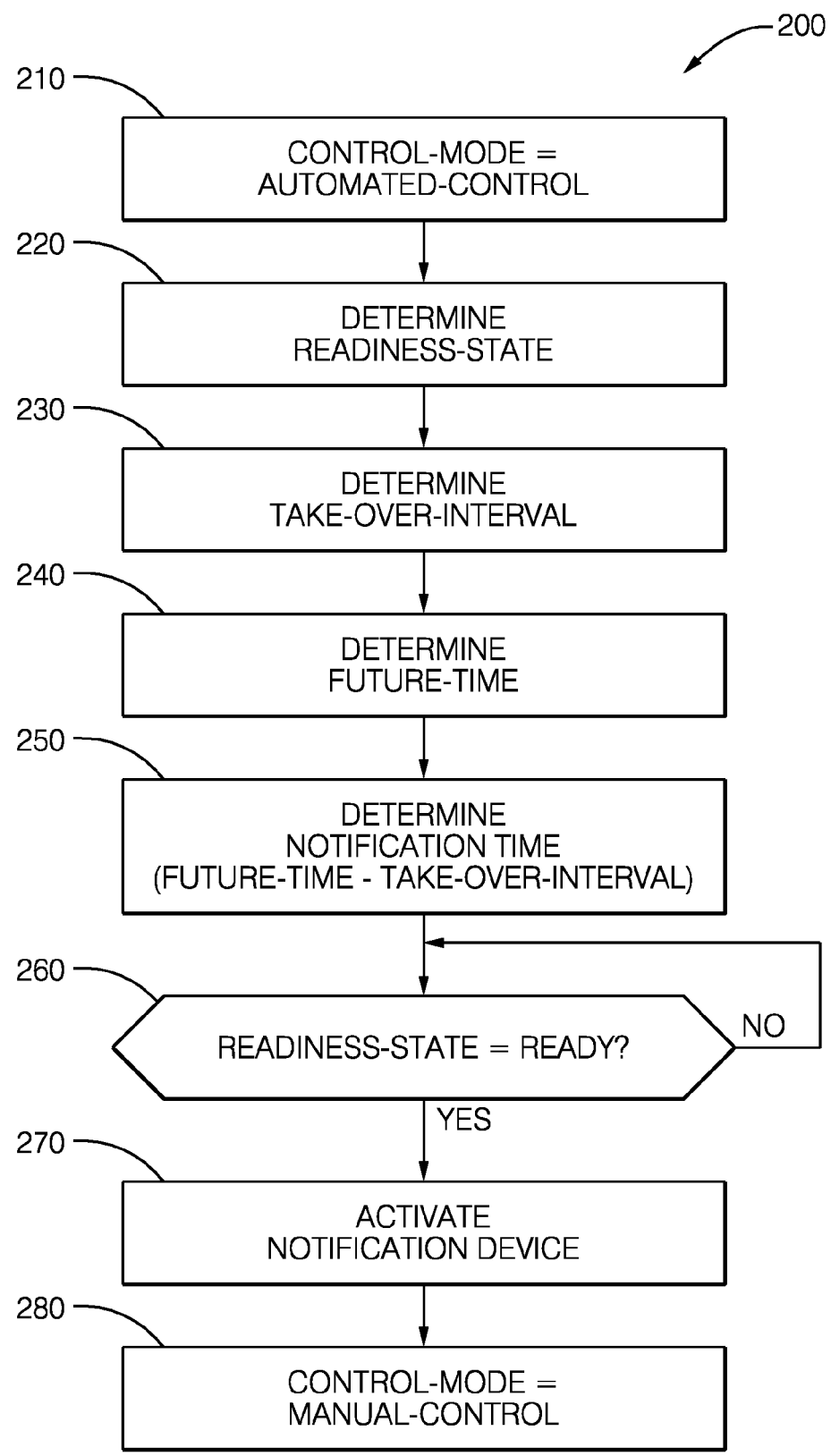
FIG. 2 is a flowchart of a method of operation of the system of FIG. 1 in accordance with one embodiment.

FIG. 2 illustrates a non-limiting example of a method 200 of operating the system 10 described herein.

Step 210, CONTROL-MODE=AUTOMATED-CONTROL, may include the operator instructing the controller 26 to set the control-mode 12 of the vehicle 14 to automated-control 16 so the operator 20 can do something other than manually operate the vehicle 14. Instructing the controller 26 may be by way of operating a switch, or by way of a verbal command, or any other means known to those in the art.

It is recognized that the order of some of the following steps could be changed and still provide useful operation. As such, it is emphasized that the method 200 is a non-limiting example Step 220, DETERMINE READINESS-STATE, may include continuous or periodic monitoring of the operator 20 via the operator-detection device 24. From this information, the controller 26 can determine if the operator 20 is READY to quickly take-over manual control of the vehicle 14 if necessary, or if the operator 20 needs some advanced warning that the take-over is needed because the operator 20 is characterized as NOT-READY.

Step 230, DETERMINE TAKE-OVER-INTERVAL, may include determining the degree to which the operator 20 is NOT-READY. If the operator 20 is READY, the take-over-interval may be relatively short, one second for example. However, if the operator 20 is sound asleep lying across the seat of the vehicle 14, the take-over-interval 36 may be on the order of thirty seconds to allow time for the operator 20 to wake-up and prepare to take control of the vehicle 14. Examples of other degrees of NOT-READY and corresponding values of the take-over-interval 36 were previously described.

Step 240, DETERMINE FUTURE-TIME, may include the controller determining when the transition from automated-control 16 to manual-control 18 needs to be completed to continue uninterrupted movement of the vehicle 14

Step 250, DETERMINE NOTIFICATION TIME (FUTURE-TIME–TAKE-OVER-INTERVAL), may include subtracting from the future time 32 the value of the take-over-interval 36 to determine when the notification device 38 should be activated so the operator 20 is not notified too early or too late to prepare to take manual-control of the vehicle 14.

Step 260, ACTIVATE NOTIFICATION DEVICE, may include activating one or more of the notification-device 38 described elsewhere herein. If the timing of the future-time 32 relative to the take-over-interval 36 is close, Step 260 may also include increasing the notification-intensity 42 to get the operator 20 to respond more quickly.

Step 270, READINESS-STATE=READY?, may include monitoring the operator 20 until the readiness-state 22 of the operator 20 is READY. If the readiness-state 22 of the operator 20 is NOT-READY (i.e. the outcome of the decision is NO), the method loops back and waits until the readiness-state 22 of the operator 20 is READY (i.e. the outcome of the decision is YES). When YES, the method 200 proceeds to step 280.

Step 280, CONTROL-MODE=MANUAL-CONTROL, may include the controller 26 stopping automated control of the vehicle 14 and allowing the operator 20 to operate the vehicle-controls 66.

Accordingly, a system 10 for changing a control-mode of an automated vehicle (the vehicle 14) from automated-control 16 to manual-control 18, a controller 26 for the system 10 and a method 200 of operation for the system is provided. By determining the readiness-state of the operator 20 and using that information to determine the notification time 40 and the notification intensity 42, the system 10 avoids notifying the operator too early that the control-mode 12 of the vehicle should change from automated-control 16 to manual-control 18. Also, if the system discovers too late that the control-mode should be changed, the control-parameters 60 may be varied to provide more time for the take-over-interval 36.

While this invention has been described in terms of the preferred embodiments thereof, it is not intended to be so limited, but rather only to the extent set forth in the claims that follow.

We claim:

1. A system for changing a control-mode of an automated vehicle from automated-control to manual-control, said system comprising:
    an operator-detection device operable to detect a readiness-state of an operator of a vehicle while a control-mode of the vehicle is automated-control;
    a controller configured to forecast a future-time when the control-mode of the vehicle should change from automated-control to manual-control, determine a take-over-interval for an operator to assume manual-control of the vehicle once notified, wherein the take-over-interval is determined based on the readiness-state, and notify the operator that the control-mode of the vehicle should change from automated-control to manual-control no later than the take-over-interval prior to the future-time, wherein the controller is configured to operate the vehicle in accordance with control-parameters when the control-mode of the vehicle is automated-control and the readiness-state of the operator is ready, and the control-parameters are modified when the readiness-state of the operator is not-ready to allow for an increase of the take-over-interval.

2. The system in accordance with claim 1, wherein the readiness-state is determined based on body-orientation of the operator.

3. The system in accordance with claim 2, wherein the body-orientation is determined based on a foot-position of a foot of the operator.

4. The system in accordance with claim 2, wherein the body-orientation is determined based on a facing-direction of the operator.

5. The system in accordance with claim 2, wherein the body-orientation is determined based on a head-pose of the operator.

6. The system in accordance with claim 1, wherein the readiness-state is determined based on a distraction-level of the operator.

7. The system in accordance with claim 6, wherein the distraction-level is increased when the operator attends to a child present in the vehicle.

8. The system in accordance with claim 1, wherein the increase of the take-over-interval is realized by one of increased following-distance and decreased travel-speed.

* * * * *